(12) United States Patent
Stephen et al.

(10) Patent No.: US 11,852,864 B1
(45) Date of Patent: Dec. 26, 2023

(54) SERIAL ARRAYED WAVEGUIDE GRATING

(71) Applicant: United States of America as represented by the Administrator of NASA, Washington, DC (US)

(72) Inventors: Mark Stephen, Catonsville, MD (US); Renan Moreira, Santa Barbara, CA (US); Fabrizio Gambini, Santa Barbara, CA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/684,016

(22) Filed: Mar. 1, 2022

(51) Int. Cl.
G02B 6/12       (2006.01)
G02B 6/122      (2006.01)

(52) U.S. Cl.
CPC .......... G02B 6/12011 (2013.01); G02B 6/122 (2013.01); *G02B 2006/1215* (2013.01)

(58) Field of Classification Search
CPC ................ G02B 6/12011; G02B 6/122; G02B 2006/1215
See application file for complete search history.

(56) References Cited

U.S. PATENT DOCUMENTS

| | | | | |
|---|---|---|---|---|
| 5,455,878 A | * | 10/1995 | Thaniyavarn | G02B 6/2861 385/20 |
| 6,571,038 B1 | * | 5/2003 | Joyner | G02B 6/2813 385/27 |
| 7,724,994 B1 | * | 5/2010 | Pepper | H01Q 3/2676 385/27 |
| 7,729,572 B1 | * | 6/2010 | Pepper | H01Q 3/2682 385/27 |
| 11,209,677 B1 | * | 12/2021 | Roxworthy | G02F 1/0147 |
| 2015/0078708 A1 | * | 3/2015 | Park | G02B 6/12014 385/39 |
| 2019/0324198 A1 | * | 10/2019 | Oldenbeuving | G02B 6/29355 |

* cited by examiner

*Primary Examiner* — Sung H Pak
(74) *Attorney, Agent, or Firm* — Christopher O. Edwards; Matthew F. Johnston; Trenton J. Roche

(57) ABSTRACT

An arrayed waveguide for a photonic integrated circuit has a single optical path with serially connected delay lines. Different delayed optical paths or channels are periodically split off from the serially connected optical delay path. This has the net result of requiring much less space on-chip for comparable optical path differences with high spectral resolution.

19 Claims, 6 Drawing Sheets

SERIAL ARRAYED WAVEGUIDE GRATING

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefore.

FIELD

The aspects of the disclosed embodiments relate generally to Photonic integrated circuits (PICs), and more particularly to an arrayed waveguide grating (AWG) for a Photonic integrated circuit.

BACKGROUND

Microwave (MW) Photonics is an emerging field that requires narrow band filtering. MW sounder measurements have provided tremendous progress in numerical weather prediction, climate modelling and societal applications with high impact for human health and the economy. Current MW sounders however suffer from limited spectral resolution and coverage due to size, weight, power consumption, and cost (SWaP-C) constraints. Chip-scale integrated photonics, or Photonic Integrated Circuit (PIC) technology, provides an opportunity to reduce SWaP-C needs.

Photonic integrated circuits (PICs) have been developed for the telecommunications industry together with other photonics components. One component is an arrayed waveguide grating (AWG) that splits up an optical signal into wavelength channels—often called wavelength division multiplexing (WDM). However, there is a practical limitation to the resolution that can be achieved due to the inability to fit the long path lengths onto a photonics chip. Higher spectral resolution, significantly less than 50 GHz (a communications standard), can be difficult to achieve.

A typical arrayed waveguide grating will have a number of parallel paths. Each successive path increases in path length. The bigger the difference in path length, the better the optical resolution. However, greater differences in path length requires more space-on-chip, which will increase the size and cost.

In addition, a traditional AWG design has a wavelength filter shape determined by the optical power distribution in the channels determined by the waveguide. This can make it difficult to control the spectral shape of the output.

Accordingly, it would be desirable to provide an arrayed waveguide grating apparatus for a photonic integrated circuit that addresses at least some of the problems described above.

SUMMARY

The aspects of the disclosed embodiments are directed to an arrayed waveguide grating apparatus for a photonic integrated channelizer or spectrometer. This and other advantages of the disclosed embodiments are provided substantially as shown in, and/or described in connection with, at least one of the figures, as set forth in the independent claims. Further advantageous modifications can be found in the dependent claims.

According to a first aspect the disclosed embodiments are directed to an apparatus. In one embodiment, the apparatus includes a plurality of optical delay lines connected in series between an input light source and an output of the apparatus. Optical channels connect respective outputs of the plurality of optical delay lines to the output of the apparatus. The aspects of the disclosed embodiments provide one long delay line where fractions of light are split off throughout the delay line in a serial manner. The fraction of light split off at each channel can be controlled, which enables the output spectra to be shaped.

In a possible implementation form, the optical channels connecting respective outputs of the plurality of optical delay lines to the output are a fraction of light split off from respective ones of the plurality of optical delay lines. The fraction of light split off at each channel can be controlled, which enables the output spectra to be shaped.

In a possible implementation form, the output of the apparatus comprises a star coupler device.

In a possible implementation form, the plurality of optical delay lines are tunable optical delay lines.

In a possible implementation form, the apparatus further includes a splitter between individual ones of the plurality of optical delay lines.

In a possible implementation form, the splitter is a directional coupler.

In a possible implementation form, the splitter is a multimode interferometer.

In a possible implementation form, the splitter comprises a tunable splitter configured to enable any fraction of light to be coupled to respective ones of the optical channels.

In a possible implementation form, a heater is configured to thermally tune the optical delay line.

In a possible implementation form, a voltage signal is configured to electrically tune the optical delay line.

In a possible implementation form, an integrated conducting path is designed above each optical delay line. This design minimizes the thermal crosstalk between the waveguides in the array, allowing a precise and independent control of the output spectra.

In a possible implementation form, an electro-optic tuner is configured to electrically tune the optical delay line.

In a possible implementation form, the apparatus forms an N channel photonic integrated channelizer.

In a possible implementation form, the apparatus is an arrayed waveguide.

In a possible implementation form, the apparatus is a photonic integrated circuit.

In a possible implementation form, the apparatus is an arrayed waveguide grating with a single optical path from which different path lengths are split off at desired points.

In a possible implementation form, a phase delay between individual ones of the plurality of optical delay lines is $\Delta$ and a delay length of the plurality of optical delay lines of an N-channel array waveguide is $\Delta+\Delta+\Delta+\ldots=(N-1)\Delta$.

In a possible implementation form, the optical channels connecting respective outputs of the plurality of optical delay lines to the output are split off a main path between a first one of the plurality of optical delay lines and an Nth one of the plurality of optical delay lines at a pre-determined fraction of light.

According to a second aspect, the disclosed embodiments are directed to an arrayed waveguide apparatus. In one embodiment the apparatus comprises a plurality of optical delay lines connected in series between an input and an output of the apparatus and a splitter device connected between individual ones of the plurality of optical delay lines. The splitter device is configured to split a first optical delay line into a second optical delay line. One or more optical lines are configured to connect respective ones of the first optical delay line and the second optical delay line to the output of the apparatus.

In a possible implementation form, the splitter device comprises a directional coupler device.

In a possible implementation form, an output of the apparatus comprises a star coupler device that is configured to recombine the respective ones of the first optical delay line and second optical delay line.

According to a third aspect, the disclosed embodiments are directed to a method in an arrayed waveguide apparatus. In one embodiment, the method includes connecting a plurality of optical delay lines in series between an input light source and an output of the apparatus. Optical channels connect respective outputs of the plurality of optical delay lines to the output of the apparatus. Fractions of light are split off throughout the plurality of optical delay lines in a serial manner. The fraction of light split off at each channel can be controlled, which enables the output spectra to be shaped.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the aspects of the disclosed embodiments will be described in more detail with reference to the example embodiments shown in the drawings, in which.

DETAILED DESCRIPTION

The following detailed description illustrates exemplary aspects of the disclosed embodiments and ways in which they can be implemented. Although some modes of carrying out the aspects of the disclosed embodiments have been disclosed, those skilled in the art would recognize that other embodiments for carrying out or practicing the aspects of the disclosed embodiments are also possible.

Figure 1:
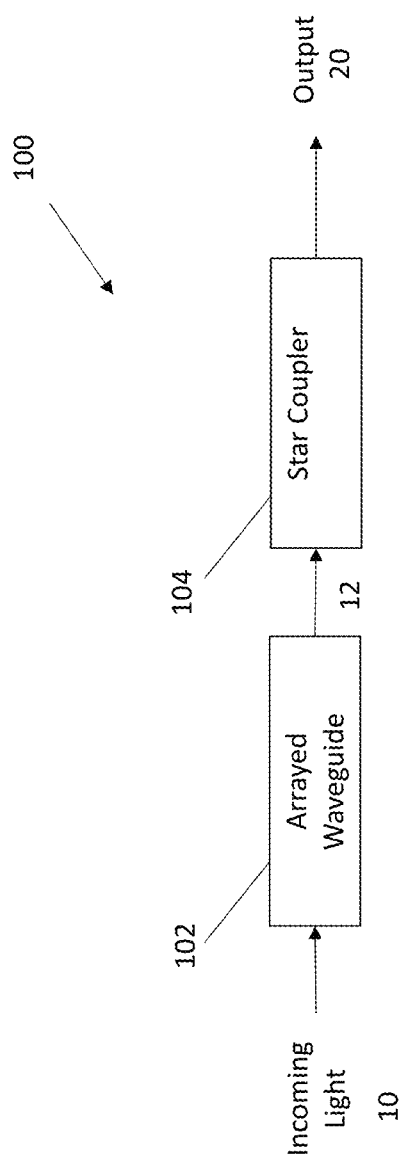
FIG. 1 is schematic block diagram of an exemplary apparatus incorporating aspects of the disclosed embodiments.
Figure 2:
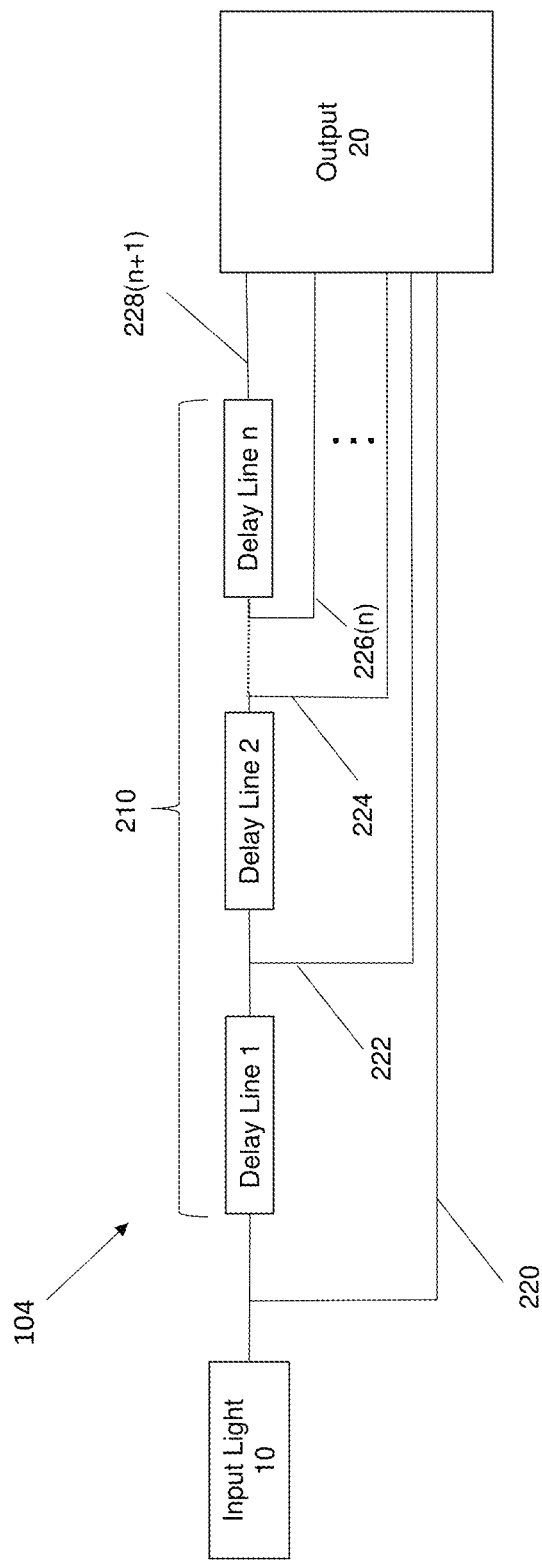
FIG. 2 is a schematic block diagram of an exemplary arrayed waveguide apparatus incorporating aspects of the disclosed embodiments.

FIG. 1 is a schematic block diagram of an exemplary apparatus 100 incorporating aspects of the disclosed embodiments. The disclosed embodiments are generally directed to an arrayed waveguide grating apparatus or device 102 for a photonic integrated circuit that is configured to enable higher spectral resolution. Referring also to FIG. 2, the arrayed waveguide 102 generally includes a plurality of optical delay lines 210 connected in series between an input light source 10 and an output 20 of the apparatus 100. In the example of FIG. 2, the optical delay lines 210 include Delay Line 1 to Delay line n.

As shown in FIG. 2, optical channels 220, 222, 224, 226$n$ and 228($n$+1) connect respective outputs of the plurality of optical delay lines 210 to the output of the apparatus 100. The arrayed waveguide grating device 102 is generally configured to provide one long delay line where fractions of light are split off throughout the delay line in a serial manner. This is in contrast to the traditional parallel arrangement where all the splitting happens up front and all the channel path delays are independent. The serial design of the arrayed waveguide grating device 102 of the disclosed embodiments enables control of the power distribution in each delay line, which allows control of the spectral shape of the output. The delay lines can also be referred to as optical delay lines.

In the example of FIG. 1, the apparatus 100 generally comprises a photonic integrated channelizer or photonic integrated circuit. As shown in FIG. 1, incoming light 10 enters the arrayed waveguide grating 102. Unlike other arrayed waveguide gratings, which split the incoming light signal into parallel channels of different lengths, the arrayed waveguide grating 102 of the disclosed embodiments is configured to direct the light signal along a single, or serial main path. The main path is generally the longest path of the arrayed waveguide grating 102. Different channels are periodically split off from the main path at various points. The need for independent parallel paths is eliminated by creating equivalent path lengths through the re-use of the same path.

In one embodiment, the output signal 12 of the arrayed waveguide 102 is delivered to a star coupler device 104. The star coupler device 104 is generally configured to take in the output signal 12 and split it into several output signals. While a star coupler device is generally referred to herein, the aspects of the disclosed embodiments are not so limited. In alternate embodiments, any suitable device other than including a star coupler can be used to receive the output signal 12 from the arrayed waveguide 102 and distribute it to a suitable number of output ports.

Figure 3:
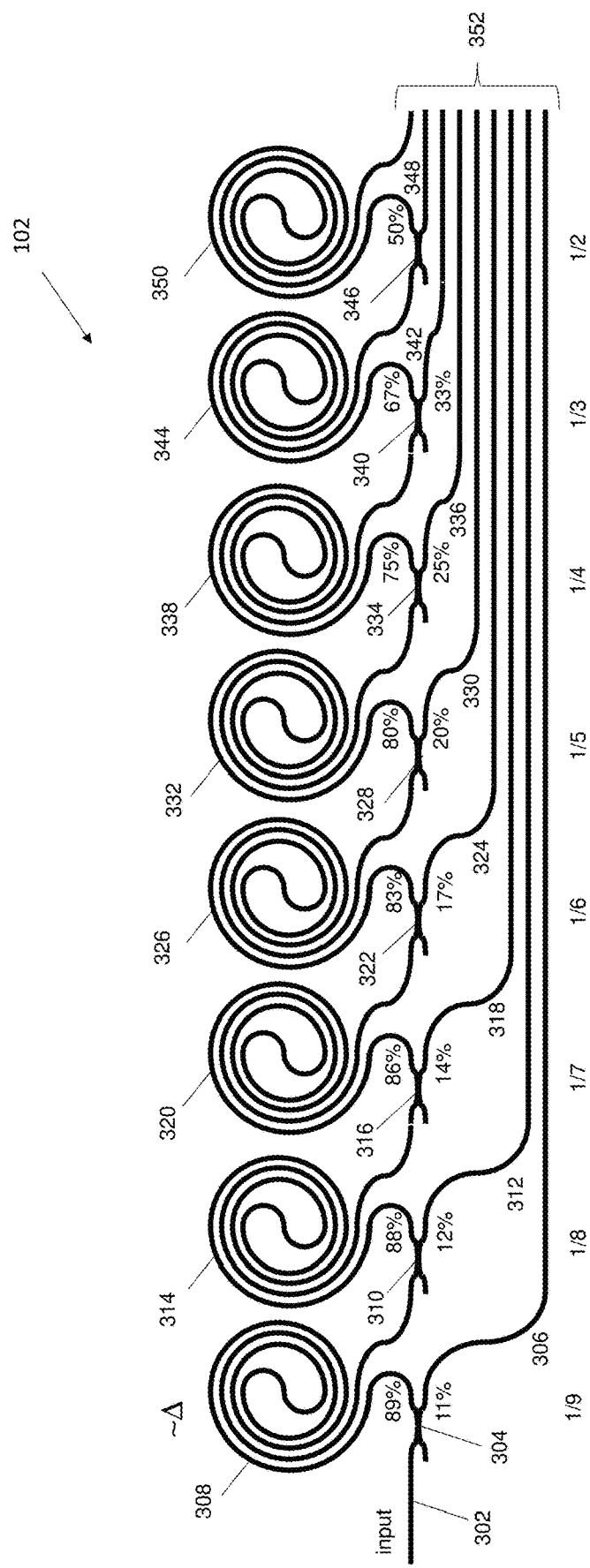
FIG. 3 is a schematic block diagram of an exemplary arrayed waveguide apparatus incorporating aspects of the disclosed embodiments.

FIG. 3 illustrates one example of an arrayed waveguide grating 102 incorporating aspects of the disclosed embodiments. As is illustrated in the example of FIG. 3, the arrayed waveguide device 102 creates the different path lengths by splitting the input signal 302 into essentially one long path in which the different optical delay lines or channels 308, 314, 320, 326, 332, 338, 344 and 350 are connected in series. Corresponding channels 312, 318, 324, 330, 336, 342 and 348 are periodically split off the main path from the optical delay lines 308, 314, 320, 326, 332, 338, 344 and 350 in the desired fraction. This has the net result of requiring much less space on-chip for comparable optical path differences.

As shown in the example of FIG. 3, the input signal 302 is split into a first optical path 306 and a second optical path 308. The first optical path 306 is coupled or connected to the output 352. The output 352 in this example can be or include the star coupler device 104. The second optical path 308 is delayed, as will be further described below.

In this example, the first optical path 306 in FIG. 3 can be referred to as the main channel or optical path. This main channel 306 is generally configured as longest path of the arrayed waveguide device 102 from the input 302. The second optical path 308 is split off from the main channel 306 to form an optical delay line of a plurality of optical delay lines. The optical delay lines 308, 314, 320, 326, 332, 338, 344 and 350 are connected in series. As will be described further below, the arrayed waveguide device 102 is a single serial path or channel waveguide, where different channels are split off from the main channel to achieve the desired delay lengths. The serial design of the arrayed waveguide 104 advantageously provides more efficient use of chip space for a variation on an AWG-type spectrometer, particularly for high-resolution requiring longer path delays.

In one embodiment, the arrayed waveguide device 102 of FIG. 3 is generally configured as an N-channel arrayed waveguide with a phase delay Δ between each optical path. In a parallel path arrayed waveguide, the delay length is generally defined as:

$$\text{Path1} + \text{Path2} + \text{Path3} + \ldots + \text{Path}N \quad \text{(i)}$$

$$0 + \Delta + 2\Delta + 3\Delta + 4\Delta + \ldots + (N-1)\Delta = [\Delta N(N-1)]/2 \quad \text{(ii)}$$

However, in the serial design arrayed waveguide 102 of FIG. 3, the delay path length is:

$$\Delta + \Delta + \Delta + \ldots = (N-1)\Delta \quad \text{(iii)}$$

Thus, an optimally designed 20-channel AWG incorporating aspects of the disclosed embodiments could potentially use ten times less area on chip than a comparable parallel path design. This provides advantages in terms of SWaP-C.

As shown in the example of FIG. 3, the delay line 308 is formed by splitting the input 302. The other delay lines 314, 320, 326, 332, 338, 344 and 350 of the arrayed waveguide device 102 are formed by splitting the preceding delay line. For example, delay line 314 is formed by splitting delay line 308. One of the split paths 318 is coupled to the output 352, while the other split path 320 is delayed or forms another delay line.

As shown in FIG. 3, the input signal 302 is split at split point 304 into channels 306 and 308. The split point 304 can also be referred to as a splitter. In one embodiment, the split point or splitter can comprise a directional coupler. The directional couplers are configured to split part of the optical signal off from the main branch, which is the sum of all the delay sections. In one embodiment, the directional coupler is configured to pull a fraction of the optical signal at regular intervals so that when all the branches are recombined at the star coupler 104, each branch has been delayed by a different amount. In alternate embodiments, any suitable device can be used to split an optical signal as is generally described herein.

The channel 306 forms the first optical path described above and the channel 308 forms the second or delayed optical path 308. The optical path or channel 306 is coupled to the output 352, while optical path or channel 308 is delayed. The selection of split point 304 and the other split points shown in FIG. 3 are based on a desired phase delay.

As shown in the example of FIG. 3, the split points 304, 310, 316, 322, 328, 334, 340 and 346 are associated with a respective percentage value or fraction. The percentage values generally correspond to the desired fraction of light intensity. The percentage values shown in FIG. 3 are merely exemplary. In alternate embodiments, the percentage value associated with a split point can correspond to any desired fraction of light intensity.

The channels or delay lines 308, 314, 320, 326, 332, 338, 344 and 350 shown in FIG. 3 are generally configured to provide the desired path length, or delay, for the arrayed waveguide device 102. In one embodiment, the delay lines 308, 314, 320, 326, 332, 338, 344 and 350 can be fixed, tunable or a combination of fixed and tunable.

Although eight (8) optical delay lines are illustrated in the example of FIG. 3, the aspects of the disclosed embodiments are not so limited. In alternate embodiments, the arrayed waveguide device 102 can include any suitable or desired number of optical delay lines, other than including eight.

In the exemplary configuration of the arrayed waveguide device 102 shown in FIG. 3, channels 306, 312, 318, 324, 330, 336, 342 and 348, which are split off from the corresponding delay lines 308, 314, 320, 326, 332, 338 and 344 are connected or coupled to the output 352. Although eight such channels are shown in the example of FIG. 3, the aspects of the disclosed embodiments are not so limited. In alternate embodiments, any suitable number of channels can be implemented and coupled to the output from a corresponding delay line, other than including eight.

In the example of FIG. 3, delay line 308 is split at split point 310 into channels 312 and 314. Channel 312 is coupled to the output 352 and channel 314 is delayed.

Channel 314 is split at split point 316 into channels 318 and 320. Channel 318 is coupled to the output 352 and channel 320 is delayed.

Channel 320 is split at split point 322 into channels 324 and 326. Channel 324 is coupled to the output 352 and channel 326 is delayed.

Channel 326 is split at split point 328 into channels 330 and 332. Channel 330 is coupled to the output 352 and channel 332 is delayed.

Channel 332 is split at split point 334 into channels 336 and 338. Channel 336 is coupled to the output 352 and channel 338 is delayed.

Channel 338 is split at split point 340 into channels into channels 342 and 344. Channel 342 is coupled to the output 352 and channel 344 is delayed.

Channel 344 is split at split point 346 into channels 348 and 350. Channel 348 is coupled to the output 352 and channel 350 is delayed. In this example, the last channel or delay line 350 forms the "Nth" channel and is coupled to the output 352 of the arrayed waveguide device. The output 352 can comprise, or is coupled to, a star coupler device, such as the star coupler device 104 of FIG. 1.

The configuration of the arrayed waveguide device 102 of FIG. 3 is merely exemplary. In alternate embodiments the arrangement of splitters, channels and delay lines can be configured in any suitable manner other than as shown in FIG. 3.

Figure 4:
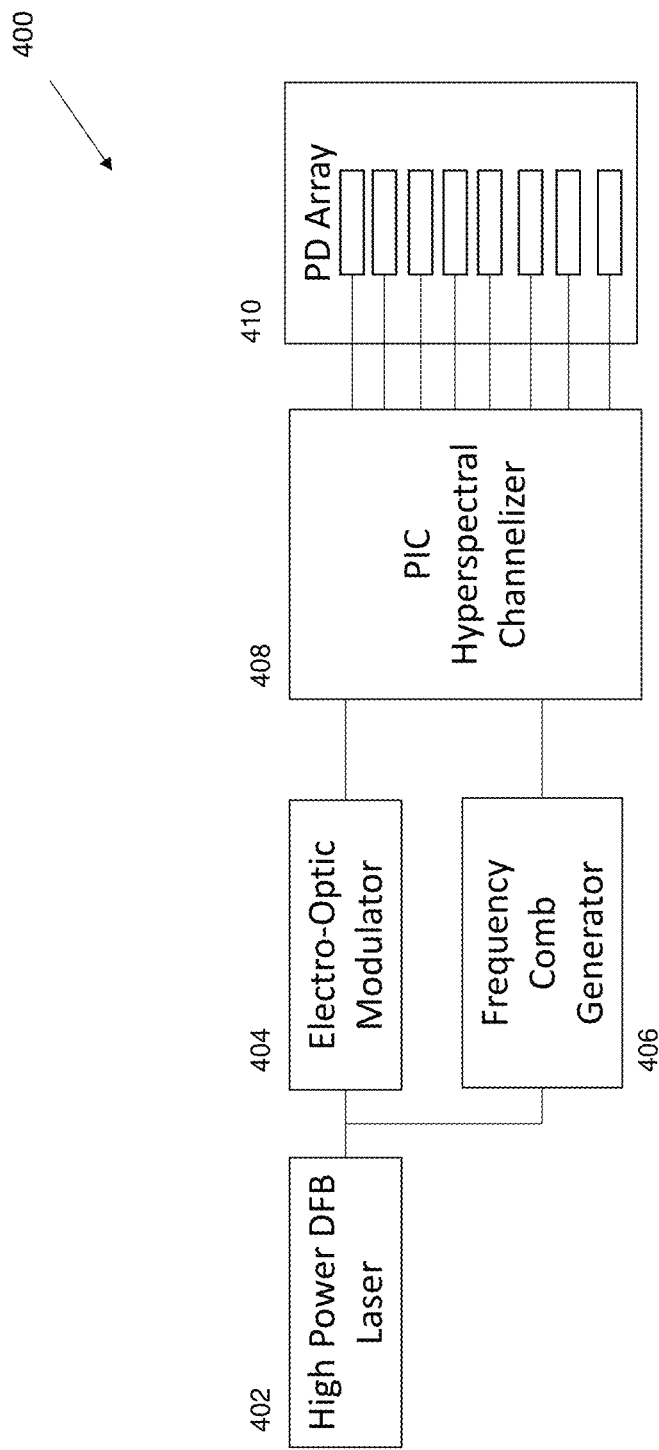
FIG. 4 is a schematic block diagram of an exemplary microwave-based spectrometer architecture for remote gas sensing.

FIG. 4 illustrates one example of a microwave-based spectrometer architecture 400 for remote gas sensing incorporating aspects of the disclosed embodiments. In this example a high power distributed feedback (DFB) Laser 402 is modulated by the input MW signal spectrum received by the antenna with an electro-optic modulator 404.

Once in the optical domain, the photonic integrated hyperspectral channelizing receiver (PIC) 408, based on the arrayed waveguide design of the disclosed embodiments, provides the filtering technology to separate the broadened optical spectral signal into several 4.5-GHz bandwidth channels, generally shown as PD Array 410. In this example, the PIC hyper-spectral channelizer 408 includes or comprises the arrayed waveguide device 104 of the disclosed embodiments.

Each channel in the PD array 410 can be down-converted to an intermediate frequency by beating it with the appropriate frequency component from an optical comb source or it can be directly detected. The result is multiple parallel channels, each spanning 0-4.5 GHz. This enables wider spectral coverage, narrower resolution and a smaller footprint.

Figure 5:
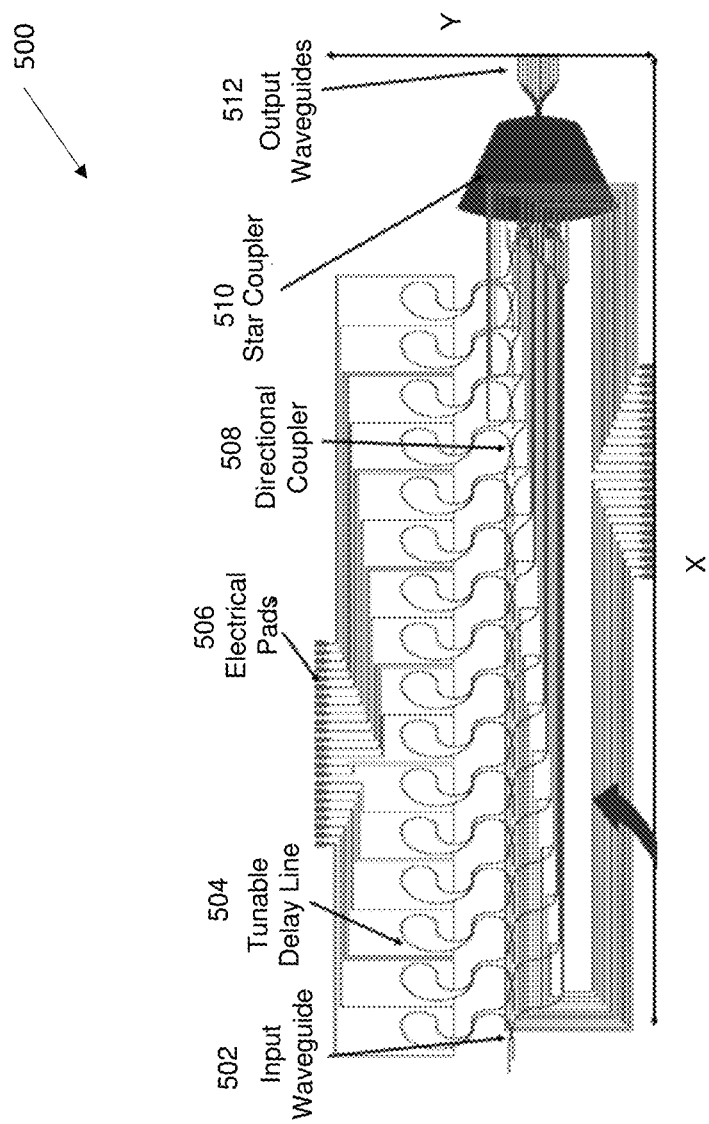
FIG. 5 is a schematic block diagram of an exemplary photonic integrated hyperspectral channelizer incorporating aspects of the disclosed embodiments.

FIG. 5 illustrates one example of the PIC hyperspectral channelizer 408 shown in FIG. 4 incorporating the arrayed waveguide device of the disclosed embodiments. In the example of FIG. 5, the device 500 consists of 16 optical delay lines (ODL) 504, 17 directional couplers (DC) 508 and a star coupler (SC) 510. The input signal from the input waveguide 502 is split in two optical paths using a corresponding directional coupler 508. The first path reaches the star coupler 510, while the second path is delayed, also referred to as a delay line. The delayed signal is then split again. Part of the delayed signal feeds the second input port of the star coupler 510, while the other part is again delayed. The output of the star coupler feeds the output waveguides 512. This process of splitting continues for each of the 16 optical delay lines 504, as was described above with respect to FIG. 3.

In the example of FIG. 5, the time delays and the splitting ratios of the directional couplers (DC) 508 have been calculated in order to obtain a bandwidth and a channel spacing equal to 4.5 GHz. In order to thermally tune the optical delay lines 504, an integrated conducting path is designed above each delay line. This design minimizes the thermal crosstalk between the input waveguide 502 and the output waveguide 512 in the array 500, allowing a precise and independent control of the output spectra.

The filtering performance of the device 500 is obtained by optimizing the configurations of the directional couplers 508 and the optical delay lines 504. In one embodiment, heaters are disposed on the device 500 to enable the control of the delay lines 504. The heater(s) is/are configured to one or more of thermally tune and electrically tune an optical delay line(s).

In one embodiment the footprint of the device 500 can be approximately 2.0 cm×0.35 cm. In alternate embodiments, the X-Y dimensions of the device 400 can be any suitable dimensions.

The device 500 of the disclosed embodiments does not require low-radius waveguide bends, which advantageously enables the insertion loss of the device 500 to be decreased below 1 dB. In one embodiment, the device 500 can be manufactured in a silicon nitride wafer.

Figure 6:
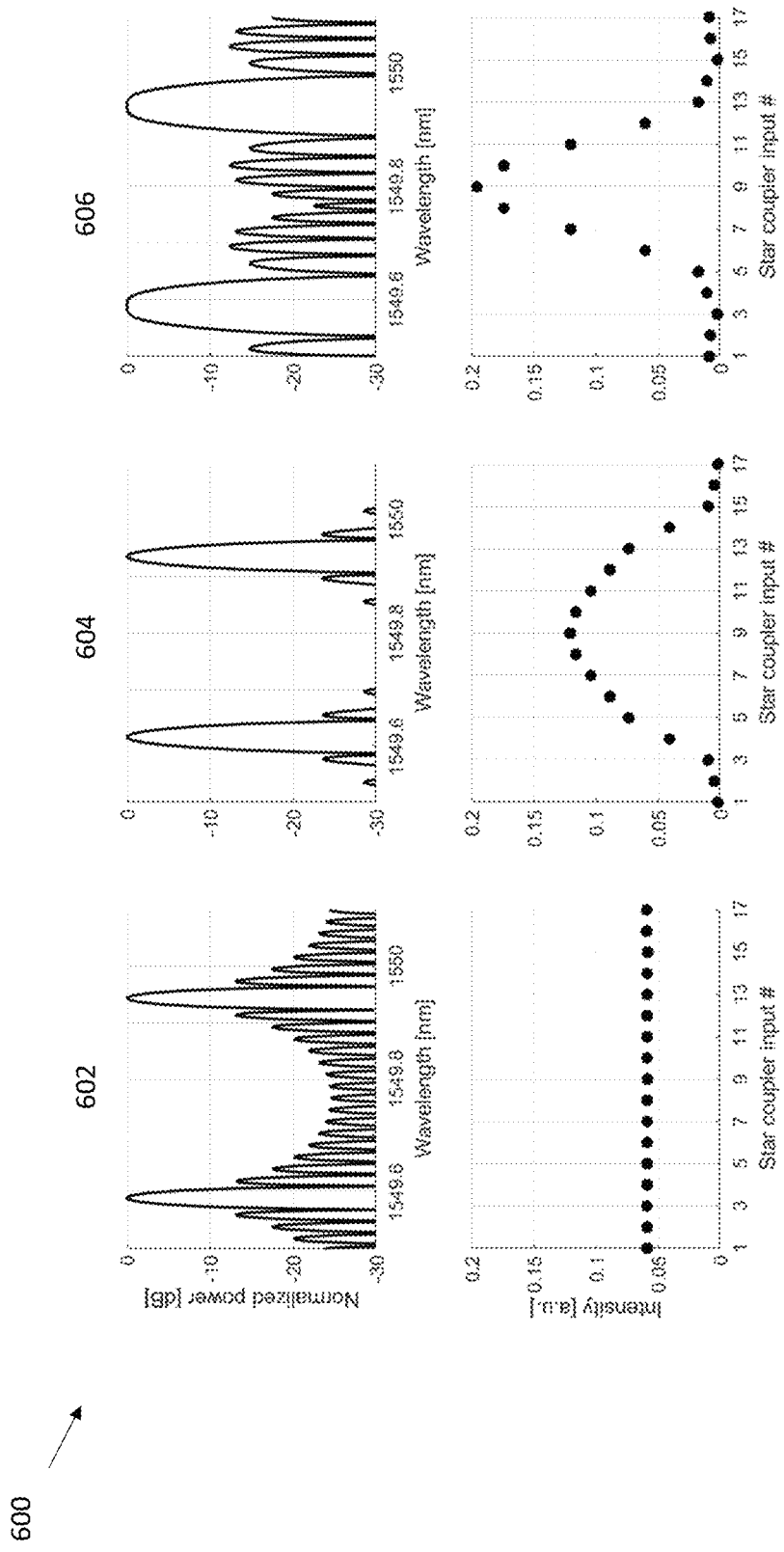
FIG. 6 illustrates simulation results of the output spectra for a single channel of an exemplary arrayed waveguide grating apparatus incorporating aspects of the disclosed embodiments.

FIG. 6 are graphs illustrating simulation results of the output spectra for a single channel of an exemplary arrayed waveguide grating apparatus incorporating aspects of the disclosed embodiments. The first row of graphs in FIG. 6 illustrate the output spectra (for one single output channel) of the serial arrayed waveguide grating, under different intensity distribution configurations at the star coupler. The second row of graphs in FIG. 6 illustrate the different intensity distributions at the star coupler.

The star coupler performs the Fourier transform of the input signal distribution and the spectra are the results of this operation. With reference also to FIG. 5, the first spectrum 602 of FIG. 6, obtained considering a constant optical intensity distribution at the 17 input ports of the star coupler 510, shows higher secondary lobes compared to the second spectrum 604. On the other hand, the third spectrum 606 reports an improved flatness response in the operational bandwidth. However, the level of the secondary lobes is not improved.

The examples shown in FIG. 6 confirm the flexibility of the serial arrayed waveguided grating of the disclosed embodiments. The variation of the optical intensity distribution at the star coupler can be obtained by changing the fraction of the light split off from the optical channels through variable directional couplers. This control enables to shape the output spectra of the device.

The aspects disclosed embodiments are generally directed to an arrayed waveguide grating for a photonic integrated circuit that enables higher spectral resolution, such as that needed for microwave sounder applications and measurements. The path lengths in the arrayed waveguide grating of the disclosed embodiments creates the different path lengths by splitting the signal into essentially one long path in which the different channels are periodically split off the main path in the desired fraction. This has the net result of requiring much less space on-chip for comparable optical path differences. The arrayed waveguide grating of the disclosed embodiments which offers higher resolution in a smaller package can find application in areas such as, but not limited to communications, sensing, beam steering, Lidar, and computing.

The photonic integrated channelizer of the disclosed embodiments can simultaneously boost the spectral resolution (<1 GHz) and band coverage (20-250 GHz), enabling significant improvements in the vertical sounding resolution and accuracy of the retrieved atmospheric water vapor and temperature profiles. The up-conversion of a MW signal to an optical carrier allows photonic signal processing techniques with a drastic SWaP-C reduction over the entire bandwidth. Benefits of the apparatus of the disclosed embodiments include, but are not limited to, a reduction in system footprint, low power consumption, broad operation bandwidth, and less sensitivity to radio frequency interference.

Modifications to embodiments of the aspects of the disclosed embodiments described in the foregoing are possible without departing from the scope of the aspects of the disclosed embodiments as defined by the accompanying claims. Expressions such as "including", "comprising", "incorporating", "have", "is" used to describe and claim the aspects of the disclosed embodiments are intended to be construed in a non-exclusive manner, namely allowing for items, components or elements not explicitly described also to be present. Reference to the singular is also to be construed to relate to the plural.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrayed waveguide apparatus comprising:
a microwave-based spectrometer;
a high power distributed feedback (DFB) Laser modulated by an input microwave signal received by an antenna with an electro-optic modulator for generating a broadened optical signal;
a filter for separating the broadened optical signal into a plurality of 4.5-GHz bandwidth channels;
a plurality of optical delay lines connected in series between an input light source and an output of the apparatus for individually receiving the plurality of the 4.5 Ghz signals connected to a plurality of directional couplers; wherein the input signal from the input waveguide is split in two optical paths using a corresponding directional coupler through an integrated conducting path above each delay line to minimizes the thermal crosstalk between the input waveguide and the output waveguide which is connected in series between an input light source and an output of the apparatus.

2. The arrayed waveguide apparatus according to claim 1, wherein the optical channels connecting respective outputs of the plurality of optical delay lines to the output are a fraction of light split off from respective ones of the plurality of optical delay lines.

3. The arrayed waveguide apparatus according to claim 1, wherein the output of the apparatus comprises a star coupler device.

4. The arrayed waveguide apparatus according to claim 1, wherein the plurality of optical delay lines comprise tunable optical delay lines.

5. The arrayed waveguide apparatus according to claim 1, further comprising a splitter between individual ones of the plurality of optical delay lines.

6. The arrayed waveguide apparatus according to claim 5, wherein the splitter comprises a tunable splitter configured to enable any fraction of light to be coupled to respective ones of the optical channels.

7. The arrayed waveguide apparatus according to claim 1, further comprising at least one heater configured to thermally tune one or more of the plurality of optical delay lines.

8. The arrayed waveguide apparatus according to claim 1, further comprising at least one heater configured to electrically tune one or more of the plurality of optical delay lines.

9. The arrayed waveguide apparatus according to claim 1, wherein the apparatus forms an N channel photonic integrated channelizer.

10. The arrayed waveguide apparatus according to claim 1, wherein a phase delay between individual ones of the plurality of optical delay lines is D and a delay length of the plurality of optical delay lines of an N-channel array waveguide is D+D+D+ . . . =(N−1) D.

11. The arrayed waveguide apparatus according to claim 1, wherein the optical channels connecting respective outputs of the plurality of optical delay lines to the output are split of a main path between a first one of the plurality of optical delay lines and an Nth one of the plurality of optical delay lines at a pre-determined fraction of light.

12. An arrayed waveguide apparatus for a photonic integrated circuit, comprising:
a microwave-based spectrometer;
a high power distributed feedback (DFB) Laser modulated by an input microwave signal received by an antenna with an electro-optic modulator for generating a broadened optical signal;
a filter for separating the broadened optical signal into a plurality of 4.5-GHz bandwidth channels;
a plurality of optical delay lines connected in series for individually receiving the plurality of the 4.5 Ghz signals between an input and an output of the apparatus;
a splitter device connected between individual ones of the plurality of optical delay lines, the splitter device being configured to split a first optical delay line into a second optical delay line; and
one or more optical lines configured to connect respective ones of the first optical delay line and the second optical delay line to the output of the apparatus.

13. The arrayed waveguide apparatus according to claim 12, wherein the one or more optical lines are split off from corresponding ones of the plurality of optical delay lines at points configured to provide a pre-determined fraction of light intensity relative to a main optical channel coupled between the input and the output of the apparatus.

14. The arrayed waveguide apparatus according to claim 12, wherein the splitter device comprises a directional coupler device.

15. The arrayed waveguide apparatus according to claim 12, wherein the output of the apparatus comprises a star coupler device that is configured to recombine the respective ones of the first optical delay line and second optical delay line.

16. The arrayed waveguide apparatus according to claim 12, wherein the plurality of optical delay lines comprise tunable optical delay lines.

17. The arrayed waveguide apparatus according to claim 12, wherein the splitter device comprises a tunable splitter configured to enable any fraction of light to be coupled to respective ones of the optical channels.

18. The arrayed waveguide apparatus according to claim 12, further comprising at least one heater configured to thermally tune one or more of the plurality of optical delay lines.

19. The arrayed waveguide apparatus according to claim 12, further comprising at least one voltage signal configured to electrically tune one or more of the plurality of optical delay lines.

* * * * *